(12) United States Patent
Tarlton

(10) Patent No.: US 6,168,007 B1
(45) Date of Patent: Jan. 2, 2001

(54) ZERO BACK PRESSURE CONVEYOR SYSTEM

(75) Inventor: Curtis S. Tarlton, Short Hills, NJ (US)

(73) Assignee: NEDCO Conveyor Company, Union, NJ (US)

( * ) Notice: Under 35 U.S.C. 154(b), the term of this patent shall be extended for 0 days.

(21) Appl. No.: 09/136,041

(22) Filed: Aug. 18, 1998

(51) Int. Cl.$^7$ .................................................. B65G 43/00
(52) U.S. Cl. ...................................................... 198/460.1
(58) Field of Search .................................. 198/809, 460.1

(56) References Cited

U.S. PATENT DOCUMENTS

| | | | |
|---|---|---|---|
| 5,085,311 | * | 2/1992 | Garro .................................... 198/460 |
| 5,125,497 | * | 6/1992 | Sundermann ......................... 198/809 |
| 5,409,096 | * | 4/1995 | Clopton .............................. 198/460.1 |
| 5,437,360 | * | 8/1995 | Eberhard ............................... 198/460 |
| 5,685,414 | * | 11/1997 | Nerenhausen ......................... 198/459 |

* cited by examiner

Primary Examiner—Robert P. Olszewski
Assistant Examiner—Bryan Jaketic
(74) Attorney, Agent, or Firm—Rohm & Monsanto, P.L.C.

(57) ABSTRACT

A zero back-pressure conveyor system of the type having a continuous transport element for urging articles along a predetermined conveyor path employs a frame that supports the continuous transport element and is formed of first and second side on opposite sides of the continuous transport element. Articles being transported along the conveyor system are supported on wear strips that are fashioned as segments along the conveyor path and are each individually actuatable between distal and proximal positions with respect to the continuous transport element. Preferably, the wear strips are actuated in pairs by operation of an articulated mechanism that precludes tilting of the articles during coupling and decoupling with respect to the continuous transport element. The articulated motion is achieved by operation of a support bar coupled to the associated wear strip, the support bar having at least one pair of pivotally coupled coupling arms. A linear actuator urges the coupling arms to rotate about their respective pivot points. Bar couplers are disposed across the conveyor to insure that pairs of wear strips operate simultaneously to prevent tilting of the articles either longitudinally or transversely with respect to the conveyor path.

21 Claims, 3 Drawing Sheets

ZERO BACK PRESSURE CONVEYOR SYSTEM

BACKGROUND OF THE INVENTION

1. Field of the Invention

This invention relates generally to conveyor systems, and more particularly, to a conveyor system that decouples an article from the portion of the conveyor system that urges the article along a conveyor path, thereby effecting zero accumulator back pressure.

2. Description of the Related Art

Articles that are conveyed along a conveyor path often accumulate, whereby subsequent ones of the articles are urged against stopped prior ones of the articles. Depending upon the friction or slippage in the communication between each subsequent article and the conveying element, which may be a belt, a chain, or the like, an accumulating force is applied to the downstream articles, which force takes the form of a back-line pressure. The downstream articles may experience a sufficient back-line pressure to cause damage to the product. In addition, the exertion of back-line pressure along a curve of the conveyor path may result in articles being urged off of the conveyor. There is a need, therefore, for an arrangement that reduces back-line pressure along a conveyor path.

One prior art approach to the back-line pressure problem is to support the articles being conveyed on side rails while the conveyor element is lowered sufficiently below the article to avoid communication therebetween. An apparatus constructed in accordance with this known approach suffers from expense and mechanical complexity associated with effecting vertical displacement of the horizontally moving conveyor element. In addition to the mechanical complication of such an approach, it is highly likely that an article being conveyed would not be situated on both side rails, and therefore, when the conveyor belt or chain is lowered, the article would have one end on a stationary rail and the other end on the moving conveyor element. In addition to tipping the article, the article could get caught and be rotated, knocked off of the conveyor by other upstream articles, or otherwise be subjected to damage.

There is, therefore, a need for an arrangement that reduces or eliminates back-line pressure in a conveyor, and which operates without displacing the conveyor element and without tipping the article.

Still another approach to the back-line pressure problem involves linking together sections of the side rails in a pivotal manner, and raising the side rail in the vicinity of a pivot joint. This results in the formation of upward and downward inclines for the articles to sit on either side of the raised pivot joint. This known arrangement causes the articles being conveyed to come to rest on an incline. Many articles that are processed using conveyor systems must remain in a horizontal orientation during such processing. There is a need, therefore, for an arrangement that reduces or eliminates back-line pressure without displacing the article angularly with respect to the horizon.

It is, therefore, an object of this invention to provide a conveyor arrangement that eliminates back-line pressure without requiring displacement of the conveyor element in a direction transverse to the conveyor path.

It is another object of this invention to provide a conveyor arrangement that effects a zero back-line pressure condition without causing angular reorientation of the article being conveyed relative to the horizon.

It is also an object of this invention to provide a conveyor arrangement that controllably decouples an article being conveyed from the conveyor drive element.

It is a further object of this invention to provide a conveyor arrangement that controls the frictional engagement between the article being conveyed and the conveyor drive element over an elongated portion of the conveyor path.

It is additionally an object of this invention to provide a conveyor arrangement wherein the frictional engagement between the article being conveyed and the conveyor drive element is controlled across the entire length of the surface of the article being presented for engagement to the conveyor drive element.

It is still another object of this invention to provide a conveyor arrangement that facilitates the accumulation of articles being conveyed on a curve of the conveyor arrangement.

It is yet another object of this invention to provide a conveyor arrangement that permits individual segments thereof to be lifted horizontally to avoid tipping and to facilitate product lifting over a desired length of the conveyor.

It is still a further object of this invention to provide a conveyor arrangement that reduces the overhanging of articles to prevent exposed ends thereof from being damaged.

SUMMARY OF THE INVENTION

The foregoing and other objects are achieved by this invention which provides, in accordance with a first apparatus aspect thereof, a zero back-pressure conveyor arrangement of the type having a continuous transport element for urging articles along a predetermined conveyor path. In accordance with this aspect of the invention, the zero back-pressure conveyor arrangement is provided with a frame for supporting the continuous transport element. The frame is provided with first and second sides on opposite sides of the continuous transport element. A first article support member is arranged substantially parallel with the first side of the frame. The article support member is coupled to a first articulated coupling element that is provided with a first support bar coupled to the first article support member, the first support bar having first and second ends. The first articulated coupling element also is provided with a first pair of coupling arms that are pivotally coupled at respective first ends thereof to respective ones of the first and second ends of the first support bar. The coupling arms are coupled at respective second ends thereof to respective ones of first and second pivot coupling locations on the first side of the frame. The first support bar is therefore pivotally articulated with respect to the first side of the frame. There is additionally provided a drive arrangement that is coupled to the first articulated coupling member for displacing the first article support member between first and second positions that are parallel to the predetermined conveyor path, and along a displacement path that is transverse to the predetermined conveyor path. Thus, when the first article support member is in the first position, the articles thereon communicate with the continuous transport element, and when the first article support member is in the second position, the articles are decoupled from the continuous transport element.

In one highly advantageous embodiment of the invention, the first article support member is displaceable controllably between the first and second position, whereby the frictional engagement between an article being conveyed and the continues transport element is controllable.

In one embodiment of the invention, a second article support member is arranged to be substantially parallel with the second side of the frame. A second articulated coupling arrangement couples the second article support member to the second side of the frame. The second articulated coupling element has a second support bar coupled to the second article support member, the second support bar having first and second ends. In addition, the second articulated coupling member is provided with a second pair of coupling arms that are pivotally coupled at respective first ends thereof to respective ones of the first and second ends of the second support bar. The second pair of coupling ends are coupled at respective second ends thereof to respective locations on the second side of the frame. In this manner, the second support bar can be pivotally articulated with respect to the second side of the frame. In this embodiment, there is additionally provided a coupling arrangement for coupling the first and second articulated coupling means to each other. By operation of such a coupling arrangement, the first and second articulated coupling arrangements are concurrently displaced between respective first and second positions that are parallel to the predetermined conveyor path, such displacement being along a displacement path that is transverse to the predetermined conveyor path, in response to the drive arrangement.

In one embodiment, the coupling arrangement includes a first coupling axle for coupling respective ones of the first and second coupling arms to each other. The axle interconnects the respective first ones of the first and second pairs of coupling arms at their respective second ends. A suitable drive arrangement includes a linear actuator that has a first end thereof coupled to the first coupling axle, and at a second end thereof, is coupled to the frame. The second end of the drive arrangement is coupled to the first side of the frame at a location that is intermediate of the first and second pivot coupling locations. In one embodiment, the drive arrangement includes a pneumatic cylinder. Of course, other forms of linear actuators, including controllable linear actuators can be employed in other embodiments of the invention. Additionally, it is to be understood that other forms of actuators can be used, such as rotatory devices that yield mechanical displacement, such as cam driven arrangements.

In a further embodiment of the invention, the coupling arrangement includes a second coupling axle for coupling respective second ones of the first and second pairs of coupling arms to one another at their respective second ends. Thus, in this embodiment, the first pair of coupling arms are coupled to each other, as are the second pair of coupling arms.

In a highly advantageous embodiment of the invention, a plurality of first and second article support members are arranged sequentially along the frame. Thus, control over the translation of the article along the conveyor path can be achieved over sequential sections of the conveyor path. Additionally, a controller system is provided to control the operation of the actuator arrangement.

In accordance with a further apparatus embodiment of the invention, a zero back-pressure conveyor system is provided having a continuous transport element that urges articles along a predetermined conveyor path. The zero back-pressure conveyor is provided with a frame for supporting the continuous transport element, the frame having first and second sides on opposite sides of the continuous transport element. First and second article support members are arranged on opposite sides of the continuous transport element. Additionally, a coupling arrangement couples the first and second article support members to the frame. Thus, the first and second article support members are translatable between proximal and distal positions with respect to the frame. The first and second article support members are substantially parallel to with respect to the first and second sides of the frame in both, the proximal and distal positions. A drive arrangement is coupled to the coupling arrangement for displacing the first and second article support members between the proximal and distal positions.

In one embodiment of the invention, the translation of the coupling arrangement between the proximal and distal positions with respect to the frame is effected along a translation path that is transverse to the predetermined conveyor path. Thus, when the article support member is in the first position, the articles thereon communicate with the continuous transport element. When the article support member is in the second position, the articles are decoupled from the continuous transport element.

In a further embodiment, the coupling arrangement includes first and second support bars coupled to respectively associated ones of the first and second article support members, the first and second support bars each having first and second ends. Additionally, first and second pairs of coupling arms are pivotally coupled at respective first ends thereof to respective ones of the first and second ends of the first and second support bars. Additionally, they are coupled at respective second ends thereof to respective ones of the first and second pivot coupling locations on the first and second sides of the frame. The first and second support bars are synchronously pivotally articulated with respect to the first and second sides of the frame.

In a further embodiment, a drive coupling arrangement is provided for coupling the drive arrangement to at least one of the first pairs of coupling arms. The drive arrangement is coupled to the first side of the frame at a location that is intermediate of the first and second pivot coupling locations. As previously stated, the drive arrangement, in one embodiment, includes a linear actuator. In this embodiment, the linear actuator operates along an actuation path that is substantially transverse to the translation path of the coupling element. In other embodiments, however, the drive arrangement includes a rotary actuator.

In accordance with a method aspect of the invention, there is provided a method of controlling the translation of an article along a conveyor path of a conveyor arrangement of the type having a continuous conveyor transport element. In accordance with this method aspect of the invention, the conveyor path has a plurality of conveyor stations therealong, the method including the steps of:

urging the article along the conveyor path by effecting communication between a bottom portion of the article and the continuous conveyor transport element, the article having a predetermined orientation with respect to the continuous conveyor transport element; actuating one of a plurality of articulated article lifting arrangements, the actuated one of the articulated article lifting arrangements being associated with a determined one of the conveyor stations where the conveyance of the article along the conveyor path is desired to be halted, said step of actuating including the further step of terminating the communication between the bottom portion of the article and the continuous conveyor transport element; and during performance of said steps of actuating and terminating the communication, there is provided the further step of maintaining the predetermined orientation of the article with respect to the continuous conveyor transport element.

In one embodiment of this method aspect of the arrangement, there is further provided the step of deactuating the actuated one of the articulated article lifting arrangements whereby the communication between the bottom portion of the article and the continuous conveyor transport element is restored. In a further embodiment, during performance of the step of deactuating there is provided the step of further maintaining the predetermined orientation of the article with respect to the continuous conveyor transport element. Thus, decoupling of the article being transported from the continuous conveyor transport element is effected without tipping the article being conveyed. In some embodiments of the invention, the actuation and deactuation of the article lifting arrangement is performed in a controlled manner, so as to enable control over the extent of frictional engagement between the articles being conveyed and the continuous conveyor transport element.

In a still further embodiment of the invention, during performance of said steps of actuating and terminating, there is provided the further step of displacing the article rearwardly. This eliminates the possibility of article overhang, and consequently reduces the risk of article damage. Preferably, the rearward displacement is effected simultaneously with the vertical displacement.

BRIEF DESCRIPTION OF THE DRAWING

Comprehension of the invention is facilitated by reading the following detailed description, in conjunction with the annexed drawing, in which.

DETAILED DESCRIPTION

Figure 1:
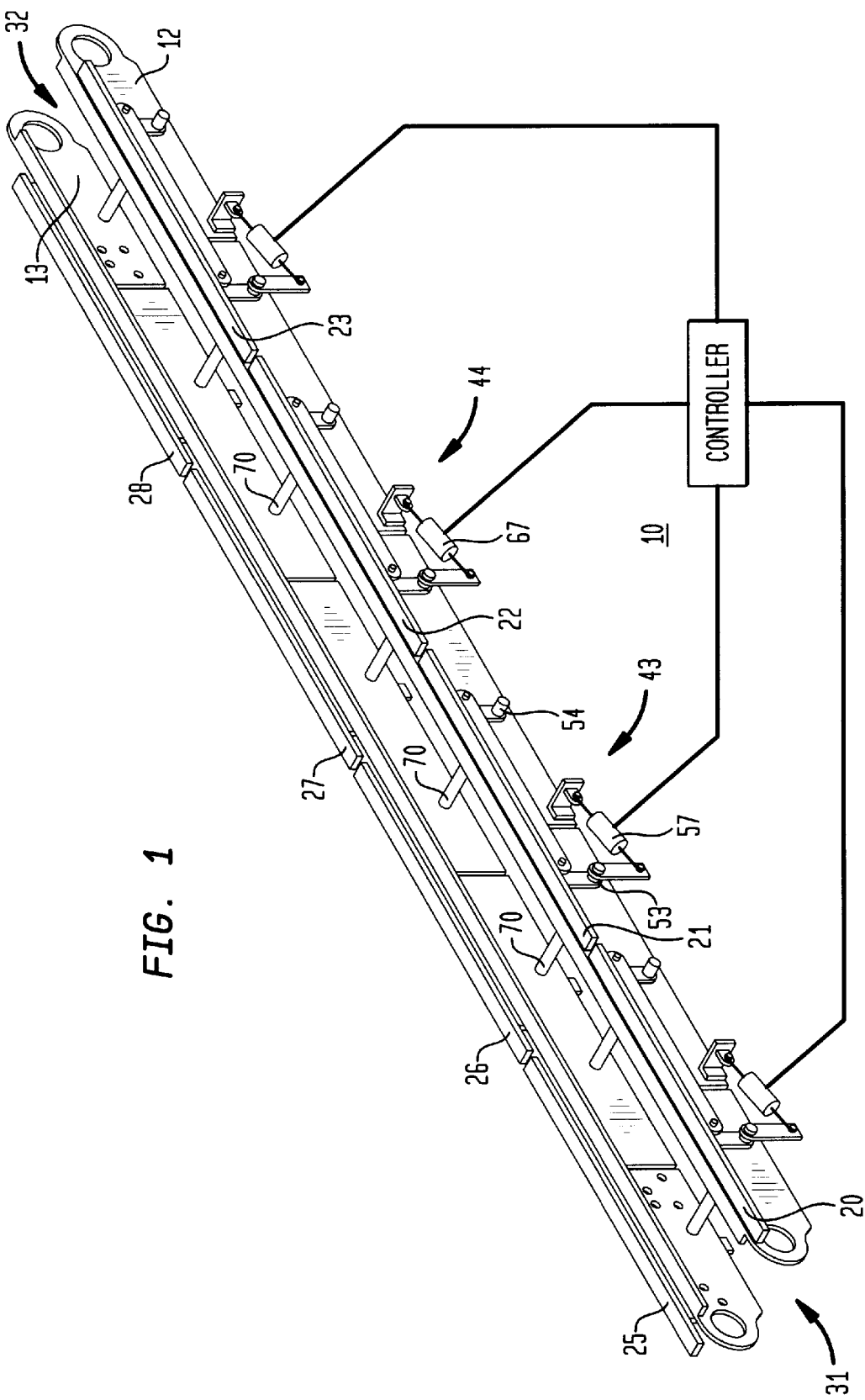
FIG. 1 is an isometric representation of a specific illustrative embodiment of the invention showing the interconnection between articulated coupling arrangements.

FIG. 1 is partially schematic representation of a specific illustrative embodiment of a conveyor system 10 constructed in accordance with the principles of the invention. The conveyor system is provided with first and second frame portions 12 and 13, respectively. In this embodiment, frame portion 12 is provided with a plurality of wear strips 20–23 that support an article (not shown in this figure) that is to be conveyed along conveyor system 10. Similarly, frame portion 13 has a corresponding sequential plurality of wear strips 25–28. A continuous transport element (not shown in this figure) is disposed between frame portions 12 and 13 and serves to urge the articles to be conveyed along the conveyor, as will be described hereinbelow.

Figure 2:
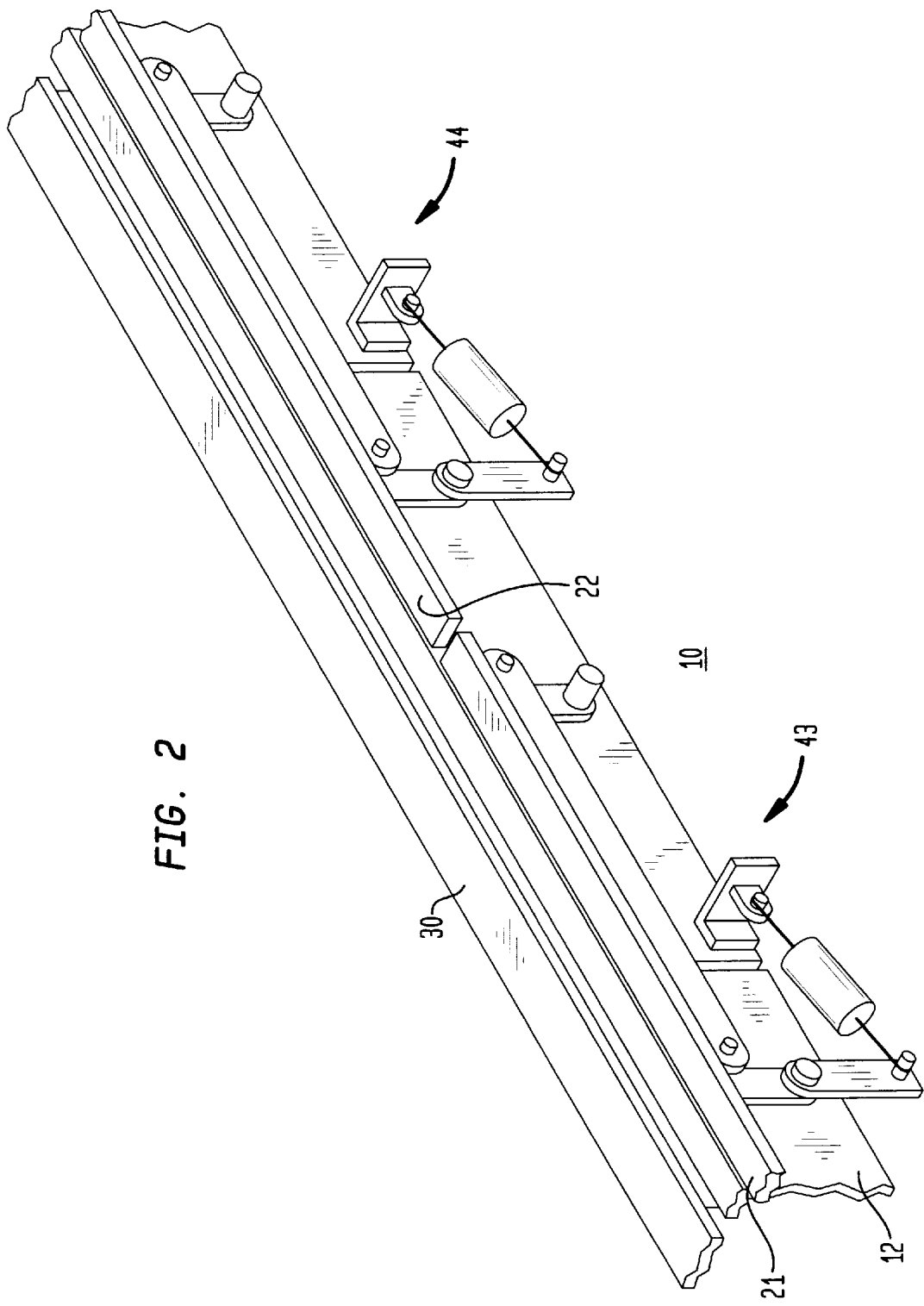
FIG. 2 is an isometric representation of the embodiment of FIG. 1 showing the continuous transport element, and respective ones of article support elements in proximal and distal positions with respect to a conveyor frame.

FIG. 2 is an isometric, partially schematic fragmented representation of a portion of conveyor system 10. This figure shows a continuous transport element 30, which may be in the form of a continuous belt, disposed between frame portion 12 and frame portion 13 (FIG. 1). It is seen from FIG. 1 that conveyor system 10 represented therein is but a portion of a larger conveyor system (not shown), the conveyor system portions being coupled to one another at termination ends 31 and 32. More specifically, frame portions 12 and 13 of conveyor system 10 are interengaged with other frame portions (not shown) to form a continuous segmented support for continuous transport element 30. The continuous transport element is not limited to the belt arrangement shown in FIG. 2, but may be any suitable conveyor transport apparatus, including, for example, a chain.

Figure 3:
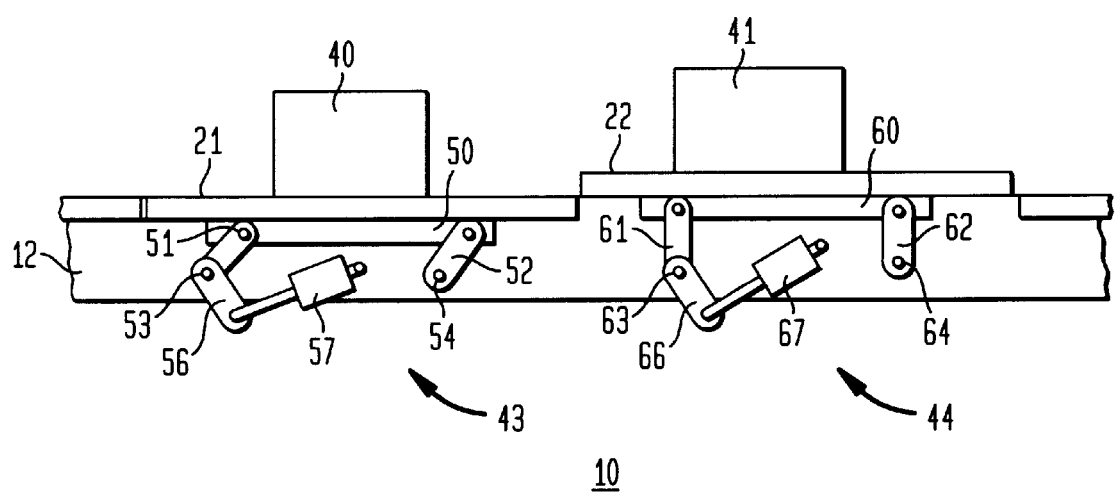
FIG. 3 is a plan representation of the embodiment of FIGS. 1 and 2 showing the coupling arrangements in the proximal and distal conditions.

FIGS. 2 and 3 illustrate the manner in which wear strips 21 and 22 are urged upward and downward to achieve coupling and decoupling of the articles being conveyed with respect to continuous transport element 30. FIG. 3 is a side plan view of the embodiments of FIGS. 1 and 2.

As shown in FIG. 3, wear strips 21 and 22 support respective articles 40 and 41 that are conveyed along conveyor system 10. Wear strip 21, in this figure, is shown to be associated with a drive arrangement that is generally designated as 43, and wear strip 22 is associated with a drive arrangement 44. Wear strip 21 is shown in a lowered condition, whereby article 40 thereon, is disposed proximal to continuous transport element 30. Thus, article 40 communicates frictionally with continuous transport element 30 and is urged in either direction along conveyor system 10 in response to the longitudinal motion of the continuous transport element. Article 41, however, is disposed on wear strip 22 which is shown in a raised, or distal position with respect to frame member 12, and consequently is decoupled from the continuous transport element. Thus, article 41 is in a stationary condition. It can be seen from FIG. 3 that irrespective of whether the articles are proximal or distal with respect to frame portion 12, they retain an untilted orientation that prevents any spillage of the contents of the articles.

Non-tilting displacement of articles 40 and 41 is achieved, in this embodiment of the invention, by utilization of an articulated displacement system. More specifically, with reference to drive arrangement 43, wear strip 21 is coupled to a support bar 50 that is pivotally coupled to a pair of coupling arms, specifically coupling arms 51 and 52. The coupling arms are pivotally coupled to frame portion 12 at respective pivot couplings 53 and 54. In this embodiment, coupling arm 51 is coupled to a drive coupling arm 56 which is itself coupled to a linear actuator 57. The linear actuator is itself coupled to frame portion 12.

Wear strip 22 is coupled to an associated support bar 60 which is pivotally coupled to coupling arms 61 and 62 in a manner similar to that described with respect to wear strip 21. The coupling arms are pivotally coupled to frame 12, and coupling arm 61 is coupled to a drive coupling arm 66 which is connected to a linear actuator 67. In this figure, linear actuator 57 is shown in an extended condition whereby wear strip 21 is lowered so as to be proximal to the continuous transport element (not shown in this figure). Conversely, linear actuator 67 is shown in a retracted condition whereby corresponding wear strip 22 is raised so as to be distal from the continuous transport element. By reason of the mechanical articulation described herein, the horizontal orientation of articles 40 and 41 is not varied during or after coupling or decoupling with the continuous transport element.

Referring once again to FIG. 1, there are shown a plurality of coupling bars 70 that are shown to extend between frame portions 12 and 13. The coupling are bars coupled to the coupling arms at the pivot points, such as at pivot points 53 and 54. At their distal ends, on the other side of frame portion 13, the coupling bars are coupled at pivot points of corresponding coupling arms (not shown) to transmit a torque thereto. Thus, in this specific embodiment, linear actuator 57 urges wear strips 21 and 26 upward and downward simultaneously. Similarly, linear actuator 67 urges wear strips 22 and 27 simultaneously between the distal and proximal positions with respect to continuous transport element 30 (not shown in this figure). As previously stated, the linear actuators are controlled, illustratively by a control arrangement 69 that is illustrated schematically in this figure.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawing and description in this disclosure are proffered to facilitate comprehension of the invention, and should not be construed to limit the scope thereof.

What is claimed is:

1. A zero back-pressure conveyor system of the type having a continuous transport element for urging articles along a predetermined conveyor path, the zero back-pressure conveyor system comprising:

a frame for supporting the continuous transport element, said frame having first and second sides on opposite sides of the continuous transport element;

a first article support member arranged substantially parallel with the first side of said frame;

first articulated coupler for coupling said first article support member to the first side of said frame, said first articulated coupler having:

a first support bar coupled to said first article support member, said first support bar having first and second ends;

a first pair of coupling arms pivotally coupled at respective first ends thereof to respective ones of the first and second ends of said first support bar, and at respective second ends thereof to respective ones of first and second pivot coupling locations on the first side of said frame, said first support bar thereby being pivotally articulated with respect to the first side of said frame; and a drive arrangement coupled to said first articulated coupler for displacing said first article support member between first and second positions parallel to the predetermined conveyor path along a displacement path that is transverse to the predetermined conveyor path, whereby when said first article support member is in the first position, the articles thereon communicate with the continuous transport element, and when said first article support member is in the second position, the articles are decoupled from the continuous transport element.

2. The zero back-pressure conveyor system of claim 1, wherein there is further provided:

a second article support member arranged substantially parallel with the second side of said frame;

second articulated coupler for coupling said second article support member to the second side of said frame, said second articulated coupler having:

a second support bar coupled to said second article support member, said second support bar having first and second ends;

a second pair of coupling arms pivotally coupled at respective first ends thereof to respective ones of the first and second ends of said second support bar, and at respective second ends thereof to respective locations on the second side of said frame, said second support bar thereby being pivotally articulated with respect to the second side of said frame; and a coupler for coupling said first and second articulated couplers to each other, whereby said first and second articulated couplers are concurrently displaced between respective first and second positions parallel to the predetermined conveyor path along a displacement path that is transverse to the predetermined conveyor path, in response to said drive arrangement.

3. The zero back-pressure conveyor system of claim 2, wherein said coupler comprises a first coupling axle for coupling respective first ones of said first and second pairs of coupling arms to each other at their respective second ends.

4. The zero back-pressure conveyor system of claim 3, wherein said drive arrangement comprises a linear actuator having a first end coupled to said first coupling axle and a second end coupled to said frame.

5. The zero back-pressure conveyor system of claim 4, wherein said second end of said drive arrangement is coupled to the first side of said frame at a location intermediate of said first and second pivot coupling locations.

6. The zero back-pressure conveyor system of claim 4, wherein said drive arrangement comprises a pneumatic cylinder.

7. The zero back-pressure conveyor system of claim 3, wherein said coupler comprises a second coupling axle for coupling respective second ones of said first and second pairs of coupling arms to one another at their respective second ends.

8. The zero back-pressure conveyor system of claim 2, wherein there is further provided a plurality of first and second article support members arranged sequentially along said frame, for forming a respective plurality of article stations.

9. The zero back-pressure conveyor system of claim 8, wherein there is further provided control means for controlling the operation of a corresponding plurality of drive arrangements.

10. A zero back-pressure conveyor system of the type having a continuous transport element for urging articles along a predetermined conveyor path, the zero back-pressure conveyor system comprising:

a frame for supporting the continuous transport element, said frame having first and second sides on opposite sides of the continuous transport element;

first and second article support members arranged on opposite sides of the continuous transport element;

a coupler for coupling said first and second article support members to said frame, said first and second article support members being translatable between proximal and distal positions with respect to said frame, said first and second article support members being substantially parallel with the first and second sides of said frame in said proximal and distal positions;

and a drive arrangement coupled to said coupler for displacing said first and second article support members between said proximal and distal positions.

11. The zero back-pressure conveyor system of claim 10, wherein the translation of said coupler between the proximal and distal positions with respect to said frame is along a translation path that is transverse to the predetermined conveyor path, whereby when said article support member is in the first position, the articles thereon communicate with the continuous transport element, and when said article support member is in the second position, the articles are decoupled from the continuous transport element.

12. The zero back-pressure conveyor system of claim 10, wherein said coupler comprises:

first and second support bars coupled to respectively associated ones of said first and second article support members, said first and second support bars each having first and second ends; and first and second pairs of coupling arms pivotally coupled at respective first ends thereof to respective ones of the first and second ends of said first and second support bars, and at respective second ends thereof to respective ones of first and second pivot coupling locations on the first and second sides of said frame, said first and second support bars being synchronously pivotally articulated with respect to the first and second sides of said frame.

13. The zero back-pressure conveyor system of claim 12, wherein there is further provided a drive coupler for coupling said drive arrangement at least one of said first pairs of coupling arms.

14. The zero back-pressure conveyor system of claim 12, wherein said drive arrangement is coupled to the first side of said frame at a location intermediate of said first and second pivot coupling locations.

15. The zero back-pressure conveyor system of claim 14, wherein said drive arrangement comprises a linear actuator.

16. The zero back-pressure conveyor system of claim 15, wherein said linear actuator operates along an actuation path that is substantially transverse to the translation path of said coupler.

17. The zero back-pressure conveyor system of claim 14, wherein said drive arrangement comprises a rotatory actuator.

18. A method of controlling translation of an article along a conveyor path of a conveyor arrangement of the type having a continuous conveyor transport element, the conveyor path having a plurality of conveyor stations therealong, the method comprising the steps of:

urging the article along the conveyor path by effecting communication between a bottom portion of the article and the continuous conveyor transport element, the article having a predetermined orientation with respect to the continuous conveyor transport element;

actuating one of a plurality of articulated article lifting arrangements, the actuated one of the articulated article lifting arrangements being associated with a determined one of the conveyor stations where the conveyance of the article along the conveyor path is desired to be halted, said step of actuating including the further step of terminating the communication between the bottom portion of the article and the continuous conveyor transport element; and during performance of said steps of actuating and terminating the communication, there is provided the further step of maintaining the predetermined orientation of the article with respect to the continuous conveyor transport element.

19. The method of claim 18, wherein there is further provided the step of deactuating the actuated one of the articulated article lifting arrangements whereby the communication between the bottom portion of the article and the continuous conveyor transport element is restored.

20. The method of claim 19, wherein during performance of said step of deactuating there is provided the step of further maintaining the predetermined orientation of the article with respect to the continuous conveyor transport element.

21. The method of claim 18, wherein during performance of said steps of actuating and terminating there is provided the further step of displacing the article rearwardly.

* * * * *